Dec. 29, 1970 J. R. RAIRDEN III 3,550,265

METHOD OF FORMING THIN FILM MAGNETIC MEMORY DEVICES HAVING LAMINATED SUBSTRATES

Filed Jan. 10, 1968

Inventor:
John R. Rairden, III,
by John J. Kissane
His Attorney.

United States Patent Office 3,550,265
Patented Dec. 29, 1970

3,550,265

METHOD OF FORMING THIN FILM MAGNETIC MEMORY DEVICES HAVING LAMINATED SUBSTRATES

John R. Rairden III, Niskayuna, N.Y., assignor to General Electric Company, a corporation of New York Filed Jan. 10, 1968, Ser. No. 696,920
Int. Cl. H01f 7/06
U.S. Cl. 29—604 8 Claims

ABSTRACT OF THE DISCLOSURE

The alignment of magnetic film sites in multiple groupings for thin film magnetic memory devices is simplified by the utilization of a laminar substrate-ground plane configuration wherein a precision dimensioned high conductivity ground plane, e.g. copper, is bonded to a roughly punched light-weight substrate, e.g. aluminum. The magnetic film sites then can be aligned by interconnecting only the precision dimensioned ground planes with sufficient spacing being provided between adjacent substrates as not to interfere with alignment. To assure a tolerable spacing between adjacent substrates, the edges of the ground planes in the laminar structure either can overlap the substrate with the edges of adjacent ground planes being joined by solder in the alignment of the sites or the ground plane edges can terminate short of the substrate edges and a precision dimensioned bridging strip is employed to electrically interconnect the ground planes. Bonding of the ground plane to the substrate to produce a suitable laminar structure can be effected by such methods as roll bonding or by the use of an adhesive such as elemental silicon intermediate a copper ground plane and aluminum substrate. The copper-silicon-aluminum structure then is heated at a temperature between 550° C. and 660° C. to bond the ground plane to the substrate.

THE DISCLOSURE

Figure 1:
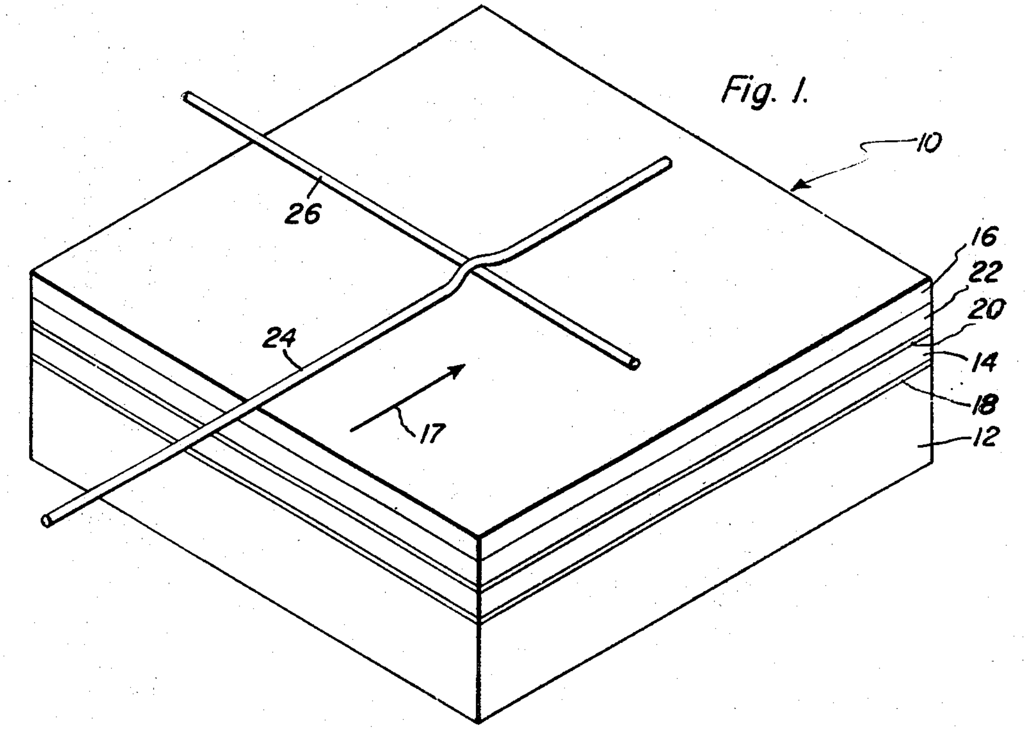

This invention relates to magnetic memory devices having a laminar ground plane-substrate structure and to a method of forming the laminar structures.

Thin film magnetic memory devices generally are characterized by a thin magnetic film deposited upon a substrate in a manner to exhibit uniaxial anisotropy and an externally applied magnetic field is employed to switch the domain structure of selected portions, or bits, of the magnetic film between one of two stable states to record, or read out, information. Where a metal such as silver, copper or aluminum is used as the substrate for the magnetic film, the substrate also serves as a ground return for the conductors applying the switching magnetic field to the thin magnetic films. Copper substrates, however, are relatively expensive and dense adding considerably to the cost and weight of large magnetic film memory units while aluminum substrates exhibit a relatively higher resistivity for a ground plane. Similarly, because the magnetic films must be deposited over a small area to assure uniformity in the deposited magnetic films, in fabricating large memory units the ground planes of many magnetic memory devices must be accurately aligned and electrically interconnected to form a properly functioning matrix. When aluminum is utilized as the ground plane material, fabrication of a matrix having an electrically continuous ground plane is achievable only with great difficulty. The alignment of film sites in multiple groupings heretofore generally has also necessitated the accurate machining of relatively thick, e.g. 0.09 inch, metal substrates.

It is, therefore, an object of this invention to provide a novel method of forming magnetic memory devices having lightweight ground planes which can be easily interconnected in forming multiple groupings.

It is a further object of this invention to provide an inexpensively constructed magnetic film memory device having a ground plane-substrate laminar structure which can be easily aligned in the formation of multiple groupings.

It is a further object of this invention to provide a novel method of bonding copper to oxidized aluminum.

These and other objects of this invention are achieved in magnetic memory devices by the utilization of a laminar ground plane-substrate structure formed by bonding a thin film of a high conductivity metal to the surface of a mechanically strong substrate of predetermined size. A magnetic thin film then is deposited atop the ground plane in a desired magnetic orientation and at least one conductive element, when suitably energized, is magnetically linked with the magnetic film to switch the magnetic orientation of the film. The substrate used in the magnetic memory device of this invention preferably is a strong, lightweight material (either metallic or nonmetallic) and functions solely as a mechanical support for the high conductivity ground plane which ground plane should be of a thickness between approximately 0.5 mil and 5.0 mils to provide easy workability and sufficient conductivity to independently serve as an electrical return for the magnetic film switching conductors.

While the manner of effectuating the bond between the ground plane and substrate can be varied, with such methods as roll bonding, gluing or alloying being suitable dependent upon the materials employed for the ground plane and substrate respectively, the bond produced must be capable of withstanding processing temperatures as high as 260° C. The bond also should preferably produce an adhesion between the substrate and the ground plane to require a perpendicularly applied stripping force greater than 2 lbs. to peel a linear inch of the ground plane from the substrate. While the bonding of oxidized aluminum to copper heretofore has been achieved only with great difficulty, I have found that adequate bonding between a naturally oxidized aluminum substrate and either a copper or silver ground plane can be produced by coating one of the surfaces to be bonded with elemental silicon, juxtaposing the aluminum substrate and the metal ground plane at an attitude to contact the elemental silicon layer with both the aluminum and metal surfaces to be joined and heating the juxtaposed surfaces at a temperature between 550° C. and 660° C. to bond the surfaces together.

Figure 2:
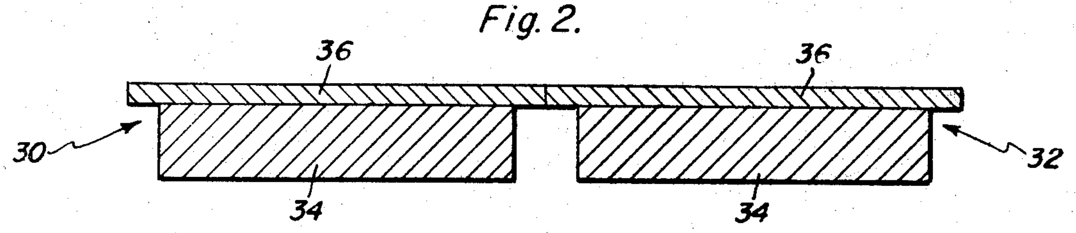
Figure 3:
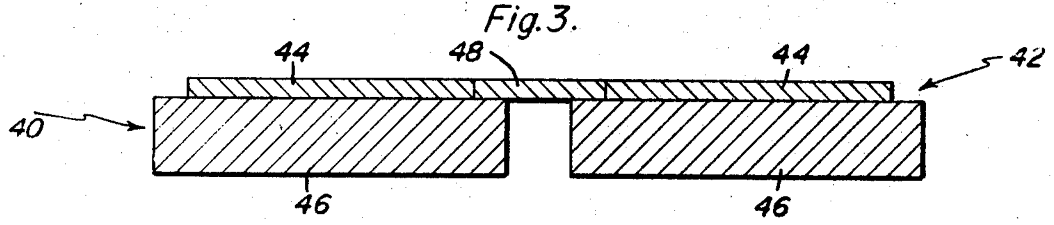
Figure 4:
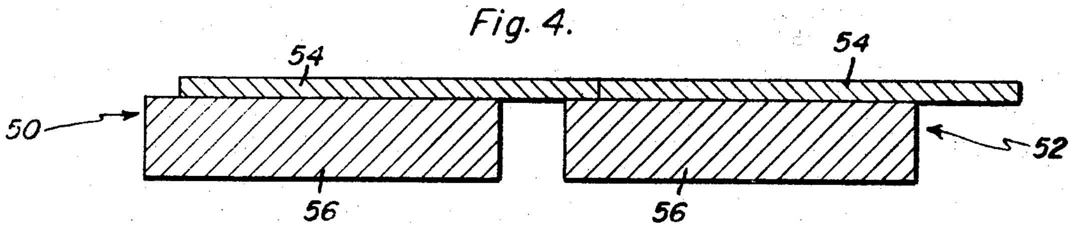

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is an isometric view of a magnetic thin film memory device formed in accordance with the method of this invention, FIG. 2 is a cross-sectional view depicting the alignment of thin film magnetic memory devices in multiple groupings when the edges of the ground plane extend beyond the edges of the substrate, FIG. 3 is a cross-sectional view of the alignment of thin film magnetic memory devices in multiple groupings when the edges of the ground plane terminate short of the edges of the substrate, and FIG. 4 is a cross-sectional view depicting an alternate method of aligning the thin film magnetic memory devices in multiple groupings.

A thin film magnetic memory device 10 formed in accordance with this invention is depicted in FIG. 1 and generally includes a lightweight, mechanically strong substrate 12 overlaid and fixedly secured to a high conductivity ground plane 14 upon which a magnetic film 16 is deposited in a desired orientation, e.g. with an easy axis aligned in the direction of arrow 17. An adhesive material 18 can be inserted intermediate substrate 12 and ground plane 14 to bond the ground plane to the substrate while one or more suitable layers, e.g. a chrome layer 20 and a silicon monoxide layer 22, can be employed to increase adhesion between the ground plane and the magnetic film and to reduce the surface roughness of the ground plane, respectively. While magnetic film 16 may contain hundreds of individual bit cells for the storage of information, only one word line 24 and one common bit sense line 26 are shown in FIG. 1 for ease of understanding the basic concept of this invention, which concept is directed to the laminar substrate-ground plane structure. The word line and the common bit sense line are electromagnetically linked with a bit cell of magnetic film 16 and function to switch the magnetic orientation of a selected portion of the magnetic film between a first and second direction and to sense the magnetic orientation of the film, respectively.

Substrate 12 can be any lightweight, mechanically strong support material, such as aluminum, glass, or carbon, and generally is of an area determined by the maximum dimensions upon which a uniformed deposition of magnetic film may be accomplished. Utilizing conventional magnetic film deposition techniques, a 4 inch square substrate generally is adequate. For aluminum substrates of this dimension, a thickness in the order of 100 mils generally is required to provide sufficient mechanical strength to adequately function as a substrate.

Metals, such as aluminum, are preferred as a substrate material because of the superior heat dissipation afforded by the metal and because the metal generally possesses a thermal-coefficient of expansion comparable to that exhibited by the high-conductivity ground plane 14 deposited thereon. Because the substrate generally must be heated to a temperature of approximately 260° C. during the deposition of magnetic film 16 in order to obtain a preferred magnetic orientation in the magnetic film, the coefficient of expansion of the substrate and ground plane should be such to prevent peeling of the ground plane from the substrate when temperature cycled from 25° C. to 260° C. In those circumstances when the coefficients of expansion of the substrate and ground plane are not compatible, it may be desirable to provide an easily-deformable layer, e.g. lead, between the ground plane and the substrate to reduce the temperature-induced strain between the layers. A difference of 10 micro-inches per inch per degree centigrade between the thermal coefficients of expansion of the ground plane and the substrate generally is sufficiently tolerable to permit temperature cycling of the laminar structure without the utilization of a deformable intermediate layer.

Ground plane 14, which functions with substrate 12 in forming the laminar structure of this invention, is a high-conductivity metal such a copper, silver, aluminum or molybdenum and generally is deposited to a thickness sufficient to provide adequate electrical conductivity to independently function as a ground return for both bit sense line 26 and word line 24 notwithstanding the fact that the substrate may be a metal conductor. Generally a minimum thickness of 0.5 mil is required for the ground plane to provide adequate electrical conductivity with greater thicknesses up to 5 mils being employed when the considerable rolling necessary for a minimum thickness enhances the cost of the laminar substrate beyond an economically acceptable limit. Copper generally is the most desirable material for ground plane 14 because copper possesses a high electrical conductivity, is readily susceptible to a high polish, e.g. by rolling, buffing or chemical treatment, and is of comparatively low economic cost. Another and very significant item in the choice of copper as a ground plane material resides in the susceptibility of copper to electrical joining in the alignment of the thin film memory devices in multiple groupings (as is more fully explained hereinafter). To enhance the smoothness and the adhesiveness of ground plane 14 prior to the deposition of magnetic film 16 thereon, a layer of chrome approximately 50 A. thick can be deposited atop the copper and silicon monoxide layer greater than 500 A. thick can be deposited atop the chrome. The magnetic film, which for example may be nickel-iron, then is deposited atop the silicon monoxide layer to a suitable thickness, e.g. approximately 200 A.

The bonding of ground plane 14 to substrate 12 can be accomplished in any suitable manner with a conventional method such as roll bonding being advantageous in that a further smoothing of the ground plane is accomplished during the bonding of the plane to the substrate. The use of adhesives to secure the ground plane to the substrate also can be employed with materials such as lithium aluminum phosphate glasses (sold under the trade name Pemco J–318 by the Glidden Company, Cleveland, Ohio) being suitable to join an anodized aluminum substrate to a copper ground plane. To secure an adequate bond using lithium aluminum phosphate glasses, the aluminum should be anodized to produce an oxide layer of between 2000 A. and 5000 A. upon the aluminum substrate prior to the coating of the aluminum surface with the glass bonding agent.

A preferred method of obtaining an adequate bond between a copper ground plane and a naturally oxidized aluminum substrate resides in coating of one of the surfaces to be joined with a layer of elemental silicon. The elemental silicon layer can be applied in any suitable manner and in one specific instance an adequate high-purity elemental silicon layer was vacuum deposited upon an unheated aluminum substrate utilizing electron beam evaporation techniques. The vacuum chamber employed in the silicon deposition was maintained at a pressure of $5\times10^{-5}$ torr and the silicon was evaporated from a water-cooled crucible utilizing an electron beam power of 4.5 kv. for approximately 8 minutes to deposit an elemental silicon film several, e.g. approximately 5, microns thick upon the aluminum substrate. The silicon coated aluminum substrate then was pressed against a copper sheet with a force of approximately 8.5 pounds per sq. inch to assure contact, without excessive air gaps, between the silicon layer and both the aluminum and copper surfaces to be joined and the pressed structure was heated at a temperature between 550° C. and 660° C. for a period, e.g. 15 to 30 minutes, to assure reaction of the silicon (and possibly some of the copper) with the aluminum ground plane. Preferably the copper-silicon-aluminum structure is heated at a temperature of 577° C., e.g. the eutectic temperature of the alloy, for a period dependent upon the degree of diffusion desired. While substantial diffusion of the silicon into the aluminum and copper layers generally is desired for good adhesive properties, care must be taken that the diffusion is not so extensive as to adversely affect the electrical conductivity of the copper ground plane.

While various bonding methods can be employed to effectuate an adhesive between the ground plane and substrate, the bonded laminar structure produced thereby must be capable of withstanding temperature cycling between 25° C. and 260° C. without peeling apart. Furthermore, the adhesion between the ground plane and substrate should be sufficient that a force greater than 2 lbs. applied perpendicularly to the ground plane is required to peel one liner inch of the ground plane from the substrate.

In order to facilitate the fabrication of the magnetic film memory devices of this invention into multiple groupings, the edge of the ground plane preferably terminates at a location diverse from the edge of the underlying substrate. Accurate dimensioning, e.g. by any conventional methods such as precision stamping or photo-etching, only of ground plane 14 (having a thickness between 0.5 mil and 5 mils) therefore need be effected to properly align the ground planes in multiple groupings rather than a dimensioning of solid metallic substrates having a thickness in the order of 90 mils. Termination of the ground plane at locations diverse from the substrate edges also permits a spacing apart of adjacent substrates in a matrix thereby allowing the substrates to be inexpensively stamped out with a relatively high tolerance.

One technique for multiple grouping magnetic memory devices in accordance with this invention is shown in simplified form in FIG. 2 by an illustration only of the ground plane-substrate structure of two adjacent magnetic memory devices. However, it is to be understood that smoothing layers, adhesive layers, magnetic film layers and switching conductors are associated with each ground plane-substrate structure of FIGS. 2, 3 and 4 in the manner depicted in FIG. 1. Each of the ground plane-substrate structures 30 and 32 of FIG. 2 are characterized by an aluminum substrate 34 underlying and fixedly secured to a copper ground plane 36, e.g. by an elemental silicon adhesive (not shown). Because the copper ground plane of each memory device extends beyond the edge of the underlying substrate, only the abutting edges of the copper ground plane need be aligned in the formation of a matrix and joining of the juxtaposed ground planes to form an electrically continuous plane can be effected in any suitable manner, for example by soldering of the ground planes. The degree of overlap of ground plane 36 relative to substrate 34 depends upon the thickness of the ground plane and preferably is at least 2 mils to permit the fabrication of substrate 36 by a stamping process having a relatively high tolerance.

A second variation in the ground plane-substrate laminar structure of this invention permitting the ready alignment of magnetic memory devices in multiple groupings is depicted in FIG. 3 wherein each of two coplanar adjacently positioned ground plane-substrate structures 40 and 42 have a precision dimensioned copper ground plane 44 terminating short of the edges of the underlying aluminum substrate 46 upon which the ground plane is secured. An accurately dimensioned filler strip 48 is situated atop the exposed edges of the substrate in bridge-like fashion between the ground planes and is electrically joined to the ground planes, e.g. by solder, to form a continuous ground plane for the multiple grouping. While the edges of ground plane 44 can terminate at any distance from the edges of the underlying substrate, preferably a 5–10 mil wide perimeter is provided between the edges of the ground plane and substrate to adequately serve as a ledge support for the filler strip.

Another alternate construction of the ground plane-substrate laminar structure of this invention permitting ready alignment of magnetic memory devices into multiple groupings is shown in FIG. 4 and generally comprises two identical, coplanar, adjacently disposed ground plane-substrate structures 50 and 52 characterized by a high-conductivity ground plane 54 overlying and fixedly secured to a lightweight substrate 56. Ground plane 54 is of an area, e.g. length and width, slightly in excess of the area of substrate 56 and the ground planes of each magnetic memory device are displaced relative to the underlying substrates so that one edge of each ground plane terminates short of the most proximate edge of the underlying substrate. The opposite edge of the ground plane, however, protrudes beyond the most proximate edge of the substrate by a distance slightly greater than the uncovered substrate span in the laminar structure. The magnetic memory devices then are aligned by placing ground plane-substrate structures 50 and 52 in justaposition with the protruding edge of the ground plane of structure 50 being supported by the exposed substrate surface of structure 52. Because the protrusion of each ground plane beyond the edge of the underlying substrate is greater than the exposed surface of the substrate, abutment of the ground planes of adjacent magnetic memory devices permits a spacing apart of the juxtaposed substrates. Thus, the substrates can be dimensioned with a relatively high tolerance and only the ground planes need be precision dimensioned to assure proper alignment of the magnetic memory devices in a matrix configuration. The structure depicted in FIG. 4 not only prevents solder loss during bonding of the ground planes by the positioning of a substrate under the joint being bonded but also requires no filler strips to effect a continuity between adjacent ground planes.

While a number of variations in laminar structures in accordance with this invention have been described, it will be obvious that other modifications and changes may be made without departing from my invention in its broader aspects. Thus, for example, the edges of the magnetic memory ground planes may terminate at the edges of the precision dimensioned underlying substrates and alignment may be effected by electrically connecting the ground planes of adjacent magnetic memory units. This method of alignment, however, has a disadvantage that the substrate need be machined to close tolerances in order to permit alignment of the magnetic memory devices in multiple groupings. I, therefore, intend the pending claims to give all such changes and modifications as fall within the true spirit and scope of my invention.

What I claim as new and desire to secure by Letters Patent of the United States is:

1. In a method of forming a magnetic thin film memory device by the deposition of a magnetic thin film in a desired magnetic orientation atop a support and magnetically linking at least one conductive element with said magnetic thin film to switch the magnetic orientation of said film, the improvement comprising forming said support device by providing a plurality of mechanically strong substrates of predetermined size, bonding a thin film of a high-conductivity metal atop each substrate at a location whereat opposite edges of said film terminate at locations diverse from the edges of said underlying substrate, said film having a thickness between 0.5 mil and 5.0 mils and being substantially thinner than said substrate, juxtaposing said film coated substrates within a common plane with each said substrate disposed at a spaced apart location relative to the adjacent substrate and electrically joining said high-conductivity films of adjacent substrates by a bridging conductor lying in a coplanar attitude relative to said thin films atop said substrates and extending across the span between adjacent substrates.

2. A method of forming a magnetic thin film memory device according to claim 1 wherein said high-conductivity thin film is copper and said substrate is aluminum.

3. A method of forming a magnetic thin film memory device according to claim 1 wherein said substrate is oxide coated aluminum, said thin film of high-conductivity metal is a metal selected from the group consisting of copper and silver, and said mechanical bonding of said thin film to said substrate surface is effectuated by vacuum evaporating a silicon source to deposit a continuous elemental silicon film atop the oxidized aluminum surface to be bonded, juxtaposing said silicon film coated aluminum surface and said copper surface at an attitude to contact said elemental silicon layer with said copper surface to be joined, and heating said juxtaposed surfaces at a temperature between 550° C. and 660° C. to bond said surfaces together.

4. A method of forming a magnetic thin film memory device according to claim 1 wherein said plurality of substrates are provided by roughly stamping out substrates of predetermined size from an aluminum sheet, said film is formed by precision stamping a copper sheet to a dimension greater than said substrate whereby said film overlies at least one edge of said substrate upon subsequent bonding of said copper film thereto and said electrical joining of said films is achieved by butting the edge of said film overlying said substrate edge against the edge of the film disposed atop the adjacent substrate.

5. A method of forming a magnetic thin film memory device according to claim 4 wherein said film-coated substrates are juxtaposed at an attitude such that the film atop one substrate overlies the edge of the spaced apart adjoining substrate.

6. In a method of forming a magnetic thin film memory device by the deposition of a magnetic thin film in a desired magnetic orientation atop a support, the improvement comprising stamping a plurality of aluminum substrates to predetermined size within a high tolerance, dissecting copper sheets having a thickness between 0.5 mil and 5.0 mils to a precise dimension relative to the tolerance of said substrates, bonding a copper sheet atop each aluminum substrate at a location whereat a plurality of the edges of said sheet terminate at locations diverse from the edges of said underlying substrate, juxtaposing said copper coated aluminum substrates within a common plane with adjacent aluminum substrates spaced apart by at least 2 mils and electrically joining said high-conductivity films of adjacent substrates by a bridging conductor lying in a coplanar attitude relative to said sheets and extending across the span between adjacent substrates.

7. A method of forming a magnetic thin film memory device according to claim 6 wherein said copper sheets are dissected to a larger size than said aluminum substrates, said sheets are bonded to said aluminum substrates with one edge protruding beyond an edge of said substrate and the opposite edge of said sheet terminating short of the edge of said substrate, and said copper coated substrates are juxtaposed at locations whereat the protruding edge of one copper sheet overlies the adjacent substrate and abuts the short terminating edge of the copper sheet affixed thereon.

8. A method of forming a magnetic thin film memory device according to claim 6 wherein said copper sheets are dissected to a smaller size than said aluminum substrates, said sheets are bonded to said aluminum substrate with opposite edges terminating short of the edges of said substrate and further including dissecting bridging strips of copper in a thickness equal to the thickness of said copper sheets, inserting said copper strips atop the exposed edges of adjoining substrates to bridge the span between substrates and electrically bonding said strips to said copper sheets.

References Cited

UNITED STATES PATENTS

| | | | |
|---|---|---|---|
| 2,232,176 | 2/1941 | Guthrie | 29—502X |
| 2,612,682 | 10/1952 | Burrack | 29—197X |
| 2,916,815 | 12/1959 | Donkervoort | 29—197X |
| 2,987,816 | 6/1961 | Noland et al. | 29—502X |
| 3,161,946 | 12/1964 | Birkenbeil | 29—604 |
| 3,195,115 | 7/1965 | Bradley | 340—174 |
| 3,310,858 | 3/1967 | Johnston | 29—589X |
| 3,343,145 | 9/1967 | Bertelsen | 29—604X |
| 3,373,483 | 3/1968 | Miller | 29—504X |
| 3,411,892 | 11/1968 | Sasaki et al. | 340—174X |
| 3,462,827 | 8/1969 | Winter | 29—197X |

JOHN F. CAMPBELL, Primary Examiner

C. E. HALL, Assistant Examiner

U.S. Cl. X.R.

29—197, 472.9, 473.1, 502, 504; 340—174